United States Patent [19]

Domeracki et al.

[11] Patent Number: 5,413,879
[45] Date of Patent: May 9, 1995

[54] INTEGRATED GAS TURBINE SOLID OXIDE FUEL CELL SYSTEM

[75] Inventors: William F. Domeracki, Lake Mary, Fla.; Wayne L. Lundberg, Pittsburgh, Pa.; Thomas E. Dowdy, Orlando, Fla.; JoAnn M. Linder, Clifton Park, N.Y.

[73] Assignee: Westinghouse Electric Corporation, Pittsburgh, Pa.

[21] Appl. No.: 193,286
[22] Filed: Feb. 8, 1994
[51] Int. Cl.[6] .............................................. H01M 8/10
[52] U.S. Cl. ...................................... 429/30; 429/26; 429/34
[58] Field of Search ....................... 429/30, 26, 34, 12, 429/17, 19

[56] References Cited

U.S. PATENT DOCUMENTS

| | | | |
|---|---|---|---|
| 4,369,624 | 1/1983 | Hamm et al. | 60/39.12 |
| 4,374,184 | 2/1983 | Somers et al. | 429/17 |
| 4,490,444 | 12/1984 | Isenberg | 429/31 |
| 4,547,437 | 10/1985 | Isenberg et al. | 429/30 |
| 4,597,170 | 7/1986 | Isenberg | 29/623.5 |
| 4,728,584 | 3/1988 | Isenberg | 429/31 |
| 4,729,931 | 3/1988 | Grimble | 429/17 |
| 4,845,940 | 7/1989 | Beér | 60/732 |
| 4,876,163 | 10/1989 | Reichner | 429/30 |
| 5,047,299 | 9/1991 | Shockling | 429/20 |
| 5,200,279 | 4/1993 | Draper et al. | 429/30 |
| 5,244,752 | 9/1993 | Zymboly | 429/31 |
| 5,258,240 | 11/1993 | Di Croce et al. | 429/31 |

FOREIGN PATENT DOCUMENTS

1099959 1/1968 United Kingdom.

OTHER PUBLICATIONS

Kinoshita et al., "Fuel Cells A. Handbook", May 1988, pp. 137-140.
Lundberg et al., "The Westinghouse Solid Oxide Fuel Cell Program-A 1991 Progress Report and Review of Power Plant Conceptual Designs for Electric Utility Application", Power-Gen '91, Dec. 1991.
Lundberg, "Cogeneration Applications of a Natural Gas-Fueled SOFC Generator", Proceedings of the Symposium on FUEL CELLS, The Electrochemical Society, Nov. 1989.
Lundberg, "System Applications of Tubular Solid Oxide Fuel Cells", Proceedings of the 25th Intersociety Energy Conversion Conference, American Institute of Chemical Engineers, Aug. 1990.
Rokni, "Introduction of a Fuel Cell Into a Combined Cycle: A Competitive Choice for Future Cogeneration", ASME Cogen Turbo Power '93, American Society of Mechanical Engineers, Sep. 21-23, 1993.
Westinghouse Electric Corporation, "Solid Oxide Fuel Cell", Oct. 1992.
Westinghouse Electric Corporation, "Second Generation PFBC System Research & Development Phase 2 Topping Combustor Development", Status Report, Oct. 1991.
Westinghouse Electric Corporation, "Topping Combustor Development for Second Generation PFBC Power Plants", Status Report, Oct. 1992.
Pittsburgh Energy Technology Center, U.S. Department of Energy, "The Coal-Fired Air Furnace Combined Cycle Thermodynamic Analysis of an Externally-Fired Gas Turbine Electric Generating Plant", Jul. 1990.
Robertson et al., "Second Generation Pressurized Fluidized Bed Combustion Plant Conceptual Design and Optimization of a Second-Generation PFB Combustion Plant", Phase I Task I Report—vol. 1, Sep. 1989.
Garland, et al., "Status of Topping Combustor Development for Second-Generation Fluidized Bed Combined Cycles", Journal of Engineering for Gas Turbines and Power, vol. 114, pp. 126-131, Jan. 1992.
Dawkins, et al., "Screening Evaluation of Advanced Power Cycles", Section 4, Nov. 1986.

Primary Examiner—Anthony Skapars

[57] ABSTRACT

An improved integrated gas turbine solid oxide fuel cell system. The system has a compressor for producing compressed air that is pre-heated and then supplied to a solid oxide fuel cell generator. The solid oxide fuel cell generator, which is also supplied with a first stream of fuel, produces electrical power and a hot gas. In the solid oxide fuel cell generator, the unreacted portion of the fuel is combusted with the oxygen remaining in the hot gas to further heat the hot gas. The further heated hot gas is then directed to a topping combustor that is supplied with a second stream of fuel so as to produce a still further heated hot gas that is then expanded in a turbine.

15 Claims, 3 Drawing Sheets

INTEGRATED GAS TURBINE SOLID OXIDE FUEL CELL SYSTEM

BACKGROUND OF THE INVENTION

The present invention relates to an integrated gas turbine solid oxide fuel cell system. More specifically, the present invention relates to a gas turbine system in which the compressor produces compressed air for a solid oxide fuel cell generator and a topping combustor further heats the hot gas from the solid oxide fuel cell generator before it is expanded in the turbine.

Typically, a solid oxide fuel cell generator comprises a plurality of tubular solid fuel cells that react a gaseous fuel, such as reformed natural gas, with air to produce electrical power and a hot gas. Previously, it has been proposed to integrate such a solid oxide fuel cell generator with a gas turbine. The gas turbine compressor supplies the air for the solid oxide fuel cells, which operate at elevated pressure, and the solid oxide fuel cells produce the hot gas for expansion in the turbine. Thus, electrical power is produced by both the solid oxide fuel cell generator and the turbine.

Unfortunately, the temperature of the hot gas discharged by the solid oxide fuel cells is relatively low so that little power would be produced by the turbine if it merely expanded such relatively low temperature gas. However, since solid oxide fuel cells typically react only a portion of the fuel supplied to the cells and the hot gas produced by the cells still contains considerable oxygen, it has been proposed to employ a combustion chamber or afterburner at the exit of the solid oxide fuel cell. In the combustion chamber, the unreacted fuel is brought into contact with the hot gas from the solid oxide fuel cells. A portion of the remaining oxygen in the hot gas is utilized to combust the unreacted fuel, thereby further heating the hot gas. Such a system is disclosed utilizing a combustion chamber formed by the exhaust plenum of the solid oxide fuel cell generator in U.S. Pat. Nos. 4,729,931 (Grimble) and 5,047,299 (Shockling) and utilizing a combustion chamber formed by an afterburner disposed downstream of the solid oxide fuel cell generator in Kinoshita, et al., Fuel Cells—A Handbook, § 7.3 at 138 (May 1988).

However, the temperature to which the hot gas from the solid oxide fuel cells may be heated using the unreacted fuel is often limited to approximately 850° C. (1560° F.), whereas the optimum gas inlet temperature for a modern gas turbine is much higher.

It is therefore desirable to provide an integrated gas turbine solid oxide fuel cell system having the capability of further heating the hot gas from the solid oxide fuel cells to a temperature suitable for optimum power output in a modern gas turbine.

SUMMARY OF THE INVENTION

Accordingly, it is the general object of the current invention to provide an integrated gas turbine solid oxide fuel cell system having the capability of further heating the hot gas from the solid oxide fuel cells to a temperature suitable for optimum power output in a modern gas turbine.

Briefly, this object, as well as other objects of the current invention, is accomplished in a gas turbine system for generating electrical power comprising a compressor for producing compressed air, a solid oxide fuel cell generator, a topping combustor, and a turbine. The solid oxide fuel cell generator has (i) means for receiving the compressed air from the compressor, (ii) means for receiving a first flow of fuel, and (iii) means for reacting at least a first portion of the received first flow of fuel with the compressed air so as to produce electrical power and a hot compressed gas containing oxygen. The topping combustor has (i) means for receiving the hot compressed gas from the solid oxide fuel cell generator, (ii) means for receiving a second flow of fuel, and (iii) means for combusting the second flow fuel in the hot compressed gas so as to produce a further heated compressed gas. The turbine has (i) a rotor mounted for rotation therein and (ii) means for expanding the further heated compressed gas, thereby producing power in the turbine rotor and an expanded gas.

In the preferred embodiment, the gas turbine system further comprises means for combusting a second portion of the received first flow of fuel in the hot compressed gas produced by the solid oxide fuel cell generator so as to further heat the hot compressed gas prior to combusting the second flow of fuel in the hot compressed gas in the topping combustor.

DESCRIPTION OF THE PREFERRED EMBODIMENT

Figure 1:
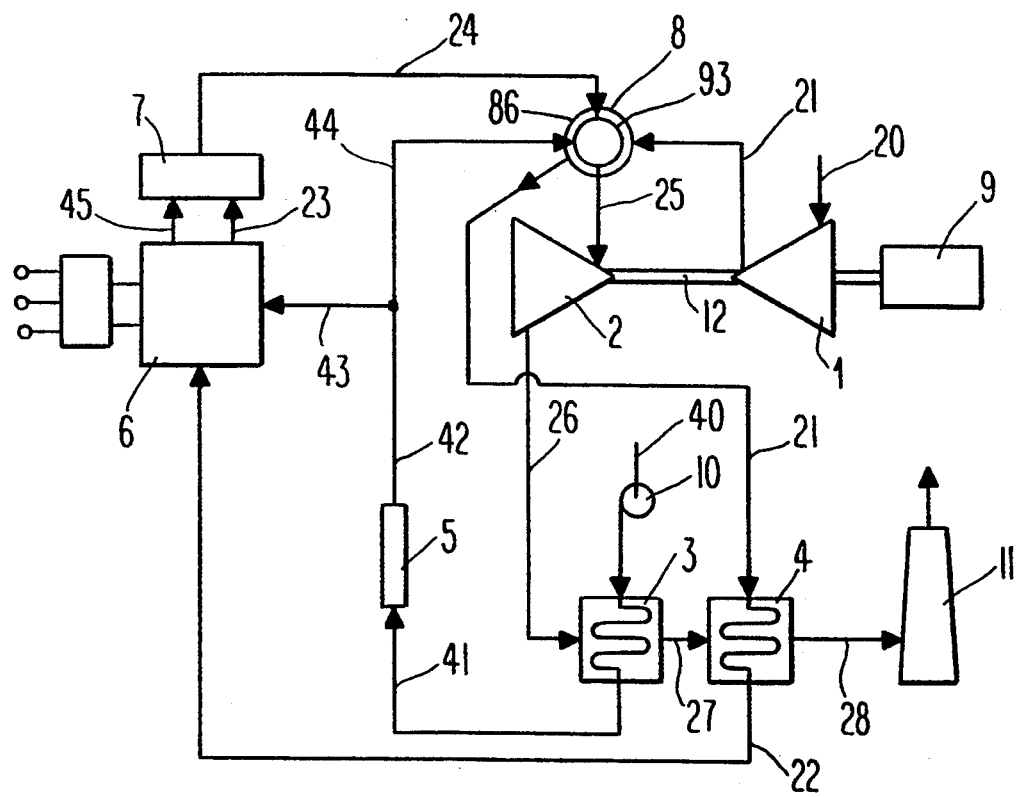
FIG. 1 is a schematic diagram of the integrated gas turbine solid oxide fuel cell system according to the current invention.

Referring to the drawings, there is shown in FIG. 1 an integrated gas turbine solid oxide fuel cell system according to the current invention. The major components of the system are a compressor 1, a turbine 2, a rotor 12 by which the turbine drives the compressor as well as an electrical generator 9, a fuel pre-heater 3, an air pre-heater 4, a fuel desulfurizer 5, a solid oxide fuel cell generator 6 with a combustion chamber 7, a topping combustor 8 and an exhaust stack 11.

Figure 4:
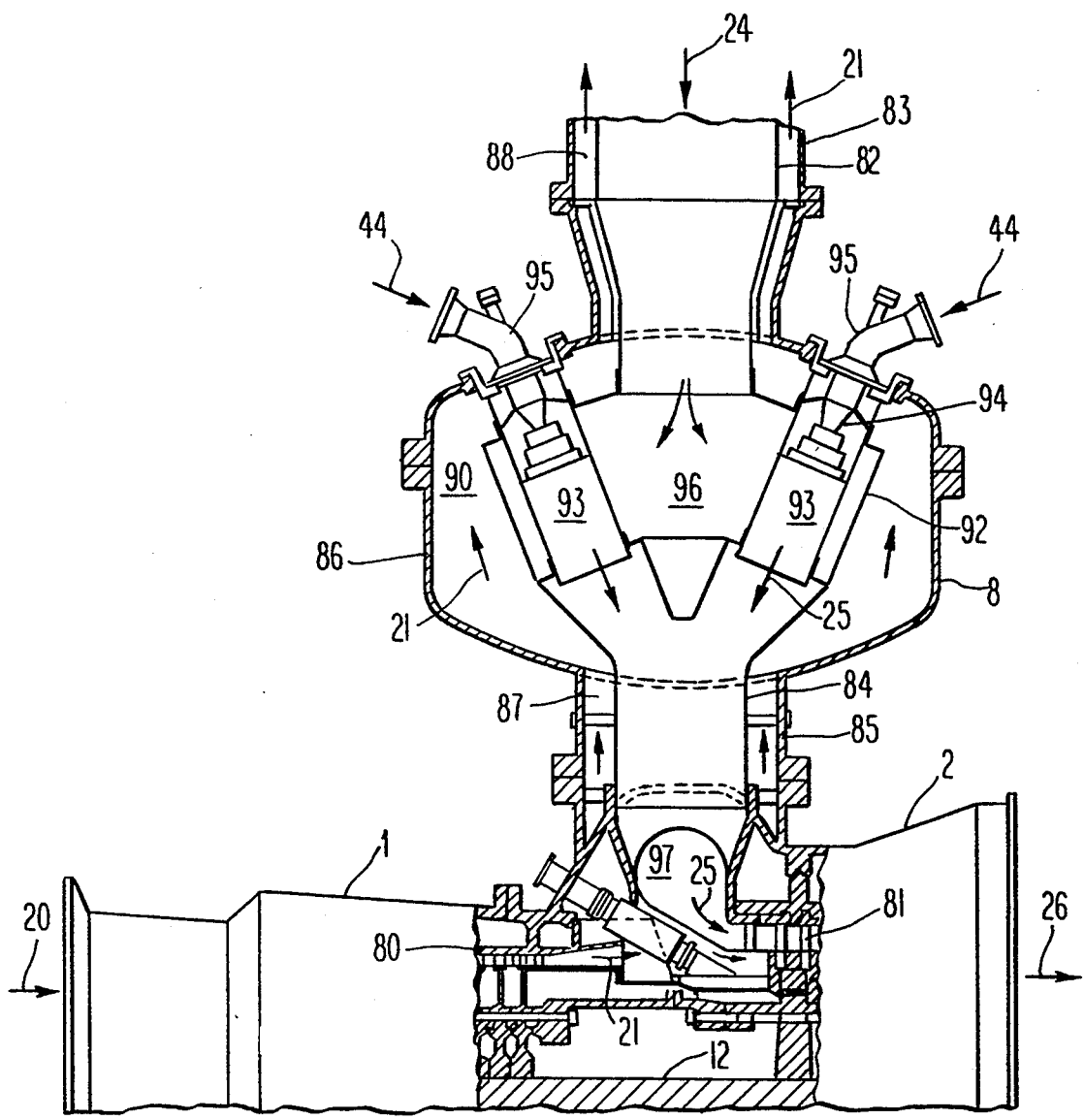
FIG. 4 is a partially cut-away elevation of the gas turbine shown in FIG. 1.

In operation, the compressor 1, which includes rows of stationary vanes and rotating blades 80, shown in FIG. 4, inducts ambient air 20 and produces compressed air 21, as shown in FIG. 1. The compressed air 21, after flowing through the vessel 86 of the topping combustor 8, as discussed further below, is then heated by the air pre-heater 4. The air pre-heater 4, which may be of the finned tube type, has heat transfer surfaces that allow heat to be transferred from the turbine exhaust gas 27 discharged by the fuel pre-heater 3 to the compressed air 21, thereby producing heated compressed air 22. In the preferred embodiment, the compressed air 22 is heated into approximately the 500°–600° C. (930°–1080° F.) temperature range. The heated compressed air 22 is then directed to the solid oxide fuel cell generator 6, discussed further below.

Gaseous fuel 40, which may be natural gas or a coal derived fuel gas, is driven by a pump 10 through the fuel pre-heater 3. The fuel pre-heater 3, which may be of the finned tube type, has heat transfer surfaces that allow heat to be transferred from the exhaust gas 26 discharged by the turbine 2 to the fuel 40, thereby producing heated fuel 41. In the preferred embodiment, the fuel 41 is heated to approximately 400° C. (750° F.). The heated fuel 41 is then directed to the desulfurizer 5, which may comprise a vessel containing a bed of sulfur sorbent through which the fuel 41 flows. In the preferred embodiment, the fuel 42 exiting from the desulfurizer 5 has less than 0.1 ppm of sulfur.

The heated and desulfurized fuel 42 is then divided into two streams. The first stream 43 is directed to the solid oxide fuel cell generator 6. The second stream forms supplemental fuel 44 that is directed to the topping combustor 8, discussed further below. The fuel 43 for the solid oxide fuel cell generator 6 may advantageously be reformed prior to reaction in the solid fuel cells—for example, gaseous hydrocarbons may be reformed in the presence of steam and a nickel catalyst into hydrogen and carbon monoxide. Such fuel reformation may be accomplished in an external fuel reformer or, preferably, in a reformer integral with the solid oxide fuel cell generator 6. Such integral reformers are disclosed in U.S. Pat. Nos. 4,729,931 (Grimble) and 5,047,299 (Shockling), each of which is hereby incorporated by reference in its entirety.

Figure 2:
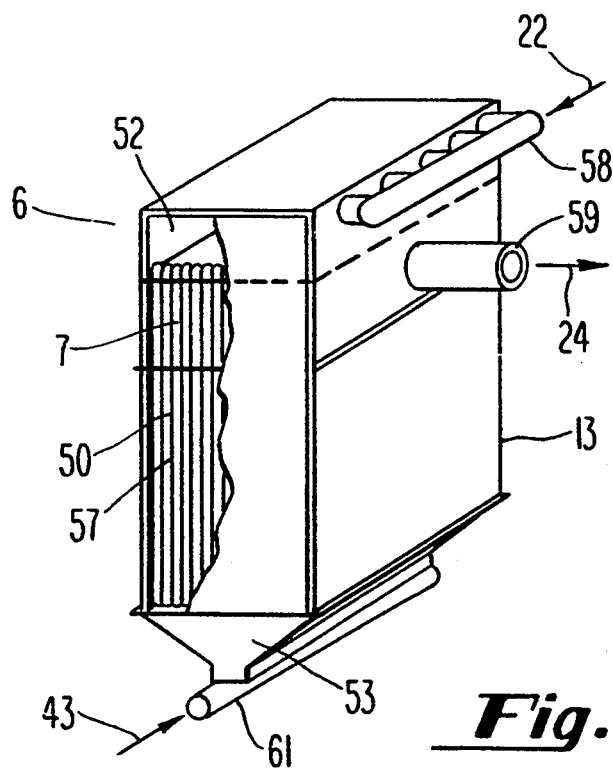
FIG. 2 is a partially cut-away, partially schematic view of the solid oxide fuel cell generator shown in FIG. 1.

The solid oxide fuel cell generator 6 is comprised of one or more modules, one of which is shown in FIG. 2. The module is formed by a housing 13 that encloses an inlet air manifold 52, an exhaust plenum combustion chamber 7, a reaction chamber 57 and an inlet fuel manifold 53. An inlet air pipe 58 connected to the housing 13 directs the heated compressed air 22 from the air pre-heater 4 to the inlet air manifold 52. A fuel inlet pipe 61 connected to the housing 13 directs the heated and desulfurized fuel 43 to the fuel inlet manifold 53. Lastly, an exhaust pipe 59 connected to the housing 13 directs the heated gas 24 from the exhaust plenum combustion chamber 7 to the topping combustor 8.

Figure 3:
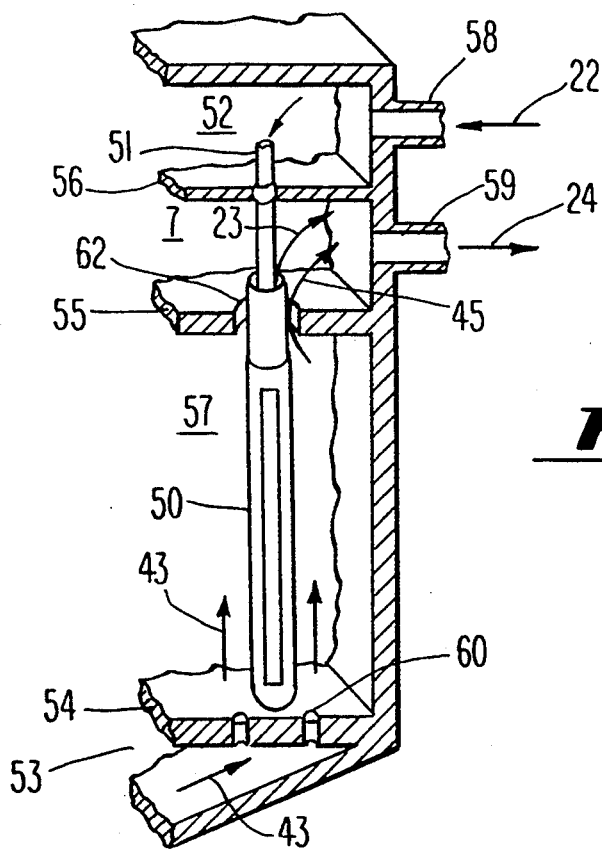
FIG. 3 is a cross-section through a portion of the solid oxide fuel cell generator shown in FIG. 2.

As shown in FIG. 3, a number of tubular solid oxide fuel cells 50 extend into the reaction chamber 57 through holes 62 in a plate 55 that separates the reaction chamber from the exhaust plenum combustion chamber 7. Typically, the solid oxide fuel cells 50 comprise a porous air electrode, a gas-tight electrolyte and a fuel electrode. The air electrode may be made of strontium-doped lanthanum manganite. The electrolyte may be made from yttria-stabilized zirconia and covers the entire active length of the air electrode except for a thin strip. This thin strip of the air electrode is covered by a gas tight layer of magnesium-doped lanthanum chromite that forms the cell interconnection. The fuel electrode may be made from nickel-zirconia cermet and covers the electrolyte except in the interconnection area. Suitable solid oxide fuel cells are disclosed in U.S. Pat. Nos. 4,490,444 (Isenberg), 4,547,437 (Isenberg et al.), 4,597,170 (Isenberg) and 4,728,584 (Isenberg), each of which is hereby incorporated by reference in its entirety. The solid oxide fuel cells 50 are arranged in an array so that each is electrically connected to the adjacent fuel cells.

As shown in FIG. 3, heated air 22 from the air inlet manifold 52 flows into air supply tubes 51. The air supply tubes 51 extend through a plate 56, separating the air inlet plenum 52 from the exhaust plenum combustion chamber 7, and then into each fuel cell 50. Thus, a portion of the heat generated in the exhaust plenum combustion chamber 7 serves to further heat the compressed air 22 prior to its introduction into the fuel cells 50.

The heated air is discharged from the air supply tube 51 near the closed end of the fuel cell 50 and then turns 180° and flows through the annular space formed between the fuel cell and the air supply tube. Fuel 43 from the inlet fuel manifold 53 flows through holes 60 in a plate 54 that separates the fuel inlet manifold from the reaction chamber 57. In the reaction chamber 57, the fuel 43 flows over the exterior of the fuel cells 50—that is, over the fuel electrodes—so that the hydrogen and carbon monoxide in the fuel electrochemically react with the oxygen ions, from the air 22, that are conducted by the air electrode, thereby producing electricity, a hot oxygen bearing gas 23 (essentially vitiated air), and spent fuel 45. In the preferred embodiment, the gas 23 is heated to approximately 925° C. (1700° F.) by the fuel cells 50.

From the reaction chamber 57, the spent fuel 45, about 15% of which is typically unreacted, flows through the holes 62 surrounding the fuel cells 50 and then into the exhaust plenum combustion chamber 7. Although in the preferred embodiment, the combustion chamber 7 is integrally formed within the solid oxide fuel cell generator 6, an external combustion chamber may also be utilized. In the exhaust plenum combustion chamber 7, the spent fuel 45 mixes with the hot gas 23 discharging from the fuel cells 50. The hot gas 23 typically still contains approximately 18% oxygen by volume. Thus, the unreacted portion of the spent fuel 45 combusts in the gas 23, thereby heating it. In the preferred embodiment, this combustion generates sufficient heat release to raise the temperature of the gas 23 to approximately 1040° C. (1900° F.). However, as a result of the heat transfer from the hot gas 23 to the incoming air 22 that occurs in the exhaust plenum combustion chamber 7, the gas 23 is cooled somewhat prior to being discharged. Consequently, in the preferred embodiment, the temperature of the gas 24 discharged from the exhaust plenum combustion chamber 7 is only approximately 850° C. (1560° F).

The hot gas 24 from the solid oxide fuel cell generator 6 is then directed, along with the second stream of heated and desulfurized fuel 44, to the topping combustor 8, as shown in FIG. 1. As shown in FIG. 4, the topping combustor is disposed externally from the shells that encloses the compressor 1 and turbine 2. The topping combustor 8 is formed by a vessel 86 that encloses a chamber 90 in which a plurality of combustor baskets 93 are disposed. Preferably the combustor baskets 93 are of the multiple annular swirl type, such as that disclosed in U.S. Pat. No. 4,845,940 (Beer), herein incorporated by reference in its entirety.

Inner and outer concentric pipes 84 and 85 are connected to the vessel 86 and form an annular passage 87 that directs the compressed air 21 from the compressor 1 to the topping combustor 8. In the topping combustor 8, the compressed air 21 flows through the chamber 90 and then into a second annular passage 88 formed by a second set of inner and outer concentric pipes 82 and 83 that are connected to the vessel 86. From the passage 88, the compressed air 21 is ultimately directed to the air pre-heater 4 and then the solid oxide fuel cell generator 6, as shown in FIG. 1. As a result of this arrangement, the compressed air 21 serves to cool the components of the topping combustor 8.

The hot gas 24 from the solid oxide fuel cell generator 6 is directed to the topping combustor 8 by the inner pipe 82. From the inner pipe 82, the hot gas 24 flows into a space 96 within the chamber 90 that is separated from the compressed air 21 by a liner 92. From the space 96, the hot gas 24 flows into the combustor baskets 93. The pre-heated and desulfurized supplemental fuel 44 is directed by pipes 95 to fuel nozzles 94 that inject it into the combustor baskets 93. In the combustor baskets 93, the fuel 44 is combusted in the hot gas 24, which still contains approximately 14–15% oxygen by volume, thereby producing further heated gas 25. In the preferred embodiment, sufficient supplemental fuel 44 is supplied to the topping combustor to heat the gas 25 to a temperature in excess of 1200° C. (2200° F.), and preferably to approximately 1390° C. (2540° F.) or higher depending on the limitations of the components in the turbine section 2.

The inner pipe 84 then directs the hot gas 25 to a toroidal manifold 97 that distributes it around the inlet of the turbine 2. As is conventional, the turbine 2 contains rows of stationary vanes and rotating blades 81 that cause the hot gas 25 to expand, thereby producing power to drive the rotor 12.

Returning to FIG. 1, the expanded gas 26 exhausted by the turbine 2 is directed to the fuel and air pre-heaters 3 and 4, respectively, as previously discussed. The partially cooled expanded gas 28 from the air pre-heater 4 is then discharged to atmosphere by an exhaust stack 11.

Figure 5:
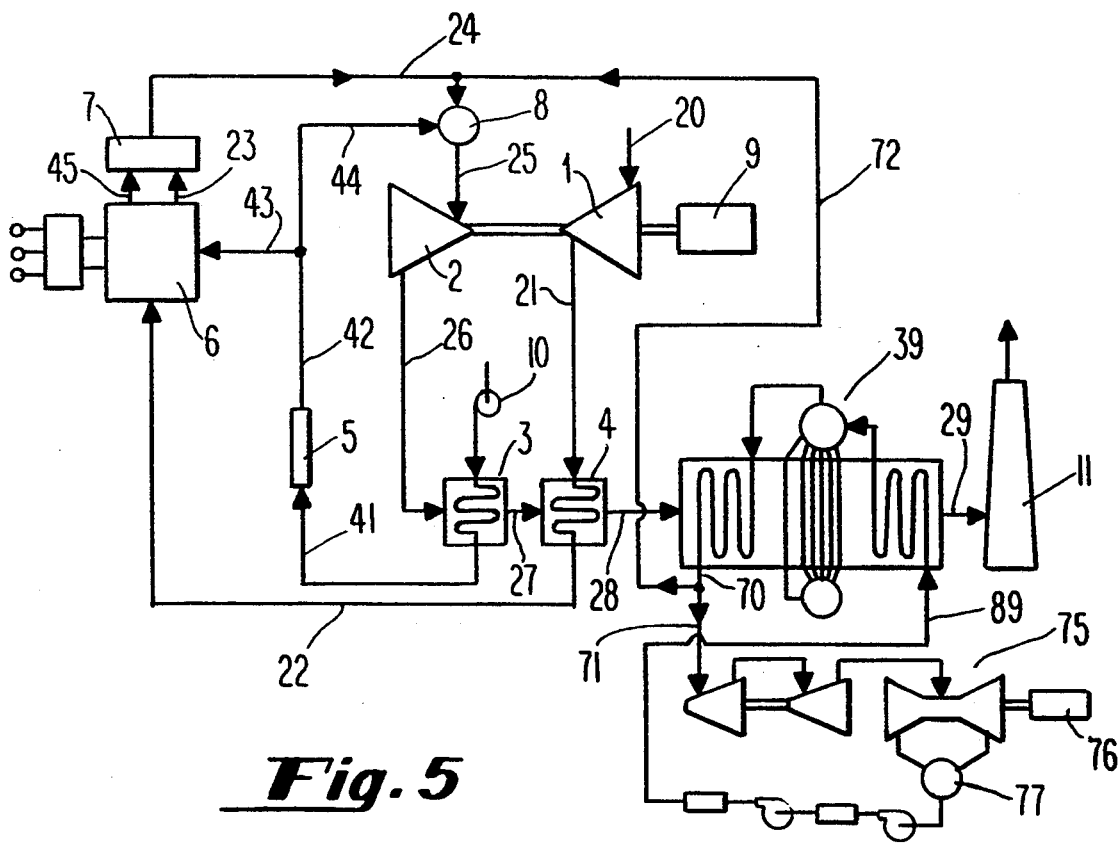
FIG. 5 is a schematic diagram of an alternate embodiment of the integrated gas turbine solid oxide fuel cell system shown in FIG. 1.

FIG. 5 shows an alternate embodiment of the current invention in which the partially cooled expanded gas from the air pre-heater 4 is directed to a heat recovery steam generator 39. The heat recovery steam generator 39 receives heated feed water 89 from a condenser 77. As is conventional, the heat recovery steam generator 39 has an economizer, evaporator and superheater, each of which has heat transfer surfaces, such as finned tubes, that allow heat to be transferred from the partially cooled expanded gas 28 to the feed water 89, thereby producing superheated steam 70 and further cooled expanded gas 29. In the preferred embodiment, the steam 70 from the heat recovery steam generator 39 is divided into two streams. The first steam stream 71 is directed to a steam turbine 75 that drives a second electrical generator 76, thereby producing additional electrical power. The second steam stream is directed by a pipe 72 to the topping combustor 8 to reduce the formation of NOx that results from the combustion of the supplemental fuel 44. The further cooled expanded gas 29 is discharged to atmosphere by the exhaust stack 11.

The present invention may be embodied in other specific forms without departing from the spirit or essential attributes thereof and, accordingly, reference should be made to the appended claims, rather than to the foregoing specification, as indicating the scope of the invention.

We claim:

1. A gas turbine system for generating electrical power, comprising:
   a) a compressor for producing compressed air;
   b) a solid oxide fuel cell generator having (i) means for receiving said compressed air from said compressor, (ii) means for receiving a first flow of fuel, and (iii) means for reacting at least a first portion of said received first flow of fuel with said compressed air so as to produce electrical power and a hot compressed gas containing oxygen;
   c) a topping combustor having (i) means for receiving said hot compressed gas from said solid oxide fuel cell generator, (ii) means for receiving a second flow of fuel, and (iii) means for combusting said second flow fuel in said hot compressed gas so as to produce a further heated compressed gas; and
   d) a turbine having (i) a rotor mounted for rotation therein and (ii) means for expanding said further heated compressed gas, thereby producing power in said turbine rotor and an expanded gas.

2. The gas turbine system according to claim 1, further comprising means for combusting a second portion of said received first flow of fuel in said hot compressed gas produced by said solid oxide fuel cell generator so as to further heat said hot compressed gas prior to combusting said second flow of fuel in said hot compressed gas in said topping combustor.

3. The gas turbine system according to claim 2, wherein said means for combusting said second flow of fuel in said hot compressed gas includes means for further heating said hot compressed gas to a temperature in excess of 1200° C.

4. The gas turbine system according to claim 2, wherein said means for combusting said second portion of said received first flow of fuel in said hot compressed gas comprises a combustion chamber integral with said solid oxide fuel cell generator.

5. The gas turbine system according to claim 2, wherein said means for combusting said second portion of said received first flow of fuel in said hot compressed gas comprises a combustion chamber disposed externally from said solid oxide fuel cell generator.

6. The gas turbine system according to claim 1, further comprising means for transferring heat from said expanded gas produced by said turbine to said first flow of fuel received by said solid oxide fuel cell generator so as to pre-heat said first flow of fuel.

7. The gas turbine system according to claim 1, further comprising means for transferring heat from said expanded gas produced by said turbine to said second flow of fuel received by said topping combustor so as to pre-heat said second flow of fuel.

8. The gas turbine system according to claim 1, further comprising means for transferring heat from said expanded gas produced by said turbine to said compressed air received by said solid oxide fuel cell generator so as to pre-heat said compressed air.

9. The gas turbine system according to claim 1, further comprising a heat recovery steam generator having means for transferring heat from said expanded gas produced by said turbine to feed water, thereby producing steam.

10. The gas turbine system according to claim 9, further comprising a steam turbine for expanding said steam produced by said heat recovery steam generator.

11. The gas turbine system according to claim 9, further comprising means for directing said steam produced by said heat recovery steam generator to said topping combustor.

12. The gas turbine system according to claim 1, wherein said first and second flows of fuel each comprise a flow of natural gas.

13. A gas turbine system for generating electrical power, comprising:
   a) a compressor for producing compressed air;
   b) a solid oxide fuel cell generator having (i) an air inlet manifold in flow communication with said compressor, (ii) a fuel inlet manifold having means for receiving a first flow of fuel, (iii) a plurality of solid oxide fuel cells in flow communication with said air inlet manifold, (iv) a reaction chamber in flow communication with said fuel inlet manifold and in which said solid oxide fuel cells are disposed, whereby said solid oxide fuel cells cause a first portion of said first flow of fuel to react with said compressed air so as to produce electrical power and hot compressed gas, and (v) a first combustion chamber in hot compressed gas flow communication with said solid oxide fuel cells and in fuel flow communication said reaction chamber, whereby said first combustion chamber combusts a second portion of said first flow of fuel in said hot compressed gas produced by said solid oxide fuel cells, thereby producing a further heated hot compressed gas;

c) a second combustion chamber in flow communication with said first combustion chamber and having means for combusting a second flow fuel in said further heated hot compressed gas from said first combustion chamber, thereby producing a still further heated compressed gas; and d) a turbine in flow communication with said second combustion chamber, whereby said turbine expands said still further heated compressed gas, thereby producing power.

14. The gas turbine system according to claim 13, wherein said compressor and turbine are each enclosed by first and second shells, respectively, and wherein said second combustion chamber is disposed externally from said shells.

15. The gas turbine system according to claim 14, wherein said second combustion chamber comprises a plurality of combustor baskets enclosed by a third shell.

* * * * *